(12) United States Patent
Au et al.

(10) Patent No.: US 8,024,286 B2
(45) Date of Patent: Sep. 20, 2011

(54) INDEPENDENT COLUMN DETECTION IN SELECTIVITY ESTIMATION

(75) Inventors: Grace Kwan-On Au, Rancho Palos Verdes, CA (US); Rama Krishna Korlapati, El Segundo, CA (US); Haiyan Chen, Yorktown Heights, NY (US)

(73) Assignee: Teradata US, Inc., Dayton, OH (US)

( * ) Notice: Subject to any disclaimer, the term of this patent is extended or adjusted under 35 U.S.C. 154(b) by 332 days.

(21) Appl. No.: 12/350,283

(22) Filed: Jan. 8, 2009

(65) Prior Publication Data

US 2010/0174702 A1    Jul. 8, 2010

(51) Int. Cl.
*G06F 17/30* (2006.01)
(52) U.S. Cl. ...................................................... 707/602
(58) Field of Classification Search .............. 707/2, 100, 707/713, 602
See application file for complete search history.

(56) References Cited

U.S. PATENT DOCUMENTS

| | | | |
|---|---|---|---|
| 5,905,988 A * | 5/1999 | Schwartz et al. ................... 1/1 |
| 7,249,120 B2 | 7/2007 | Bruno et al. |
| 7,343,369 B2 | 3/2008 | Faunce et al. |
| 7,747,606 B2 * | 6/2010 | Dageville et al. ............ 707/713 |
| 2005/0278357 A1 * | 12/2005 | Brown et al. ................. 707/100 |
| 2008/0052286 A1 | 2/2008 | Faunce et al. |
| 2008/0065594 A1 | 3/2008 | Faunce et al. |
| 2008/0154846 A1 | 6/2008 | Kutsch et al. |
| 2008/0288444 A1 | 11/2008 | Edwards et al. |
| 2008/0294604 A1 | 11/2008 | Gioswami |
| 2010/0030728 A1 * | 2/2010 | Chakkappen et al. ............ 707/2 |

* cited by examiner

*Primary Examiner* — Etienne P LeRoux
(74) *Attorney, Agent, or Firm* — Schwegman, Lundberg & Woessner

(57) ABSTRACT

Techniques for independent column detection in selectivity estimations are provided. Values for database statistics are sampled and two independent tests are performed against the values for a first column and a second column. When each test determines that the first and second columns are independent, the first and second columns are said to be independent columns for selectivity estimation.

20 Claims, 3 Drawing Sheets

INDEPENDENT COLUMN DETECTION IN SELECTIVITY ESTIMATION

BACKGROUND

Enterprises now track all aspects of their business electronically. Every transaction with a customer, information about the customer, inventory, capital, expenses, etc. are captured, indexed, and stored in an enterprise's data warehouse. Very quickly the enterprise warehouse becomes enormous in size and operations against the warehouse can be time consuming even with the most robust architectures and database techniques.

Often an enterprise wants to gather statistics about its data warehouse to help the enterprise better manage and organize database tables within the warehouse.

One particular technique is called selectivity estimation. With selectivity estimation a probability is computed to determine the probability with which any particular row in a database table will be returned with a given predicate (search condition with a comparison operation). Any particular predicate is said to be highly selective if that predicate is less than 10% (0.10) indicating that just 10% or less of the rows of a database table are likely to be returned when that predicate is used in a search query.

For non-equality predicates, traditional multi-column statistics cannot be used to estimate the combined selectivity of all predicates. For example, selectivity of the predicate "market-segment IN ('FURNITURE', 'MACHINERY') AND account-balance BETWEEN 100.23 and 200.0" cannot be accurately estimated using the current multi-column statistics on (account-balance, market-segment). Therefore, combined selectivity is computed by either using a fudge factor or simply multiplying the individual selectivities. The former is just a pure guess and the latter serves well only when the two columns are truly independent. For other cases, it can cause severe underestimation. So, the problem here is to identify the cases where two columns are independent so that the combined selectivity can be computed using multiplication of two individual selectivities.

Thus, improved mechanisms for independent column detection for use in selectivity estimation are needed.

SUMMARY

In various embodiments, techniques for independent column detection in selectivity estimation are provided. More particularly, a method for independent column detection in a selectivity estimation is provided. Specifically, multi-column statistics for a database are sampled for values associated with a first column and a second column. Next, a determination is made for a first test that the first and second columns are independent columns when a set of second column values associated with a given first column value overlaps with the second column values associated with another first column value in the multi-column statistics. Another determination is made for a second test to decide whether the first and second columns are independent columns when any given value for the first column from the values of the multi-column statistics, a corresponding range for second column values in the multi-column statistics is within a threshold of a whole range of values for the second column in the database. The first and second columns are identified as being independent columns for selectivity estimation when both the first and second tests render the first and second columns independent.

DETAILED DESCRIPTION

Figure 1:
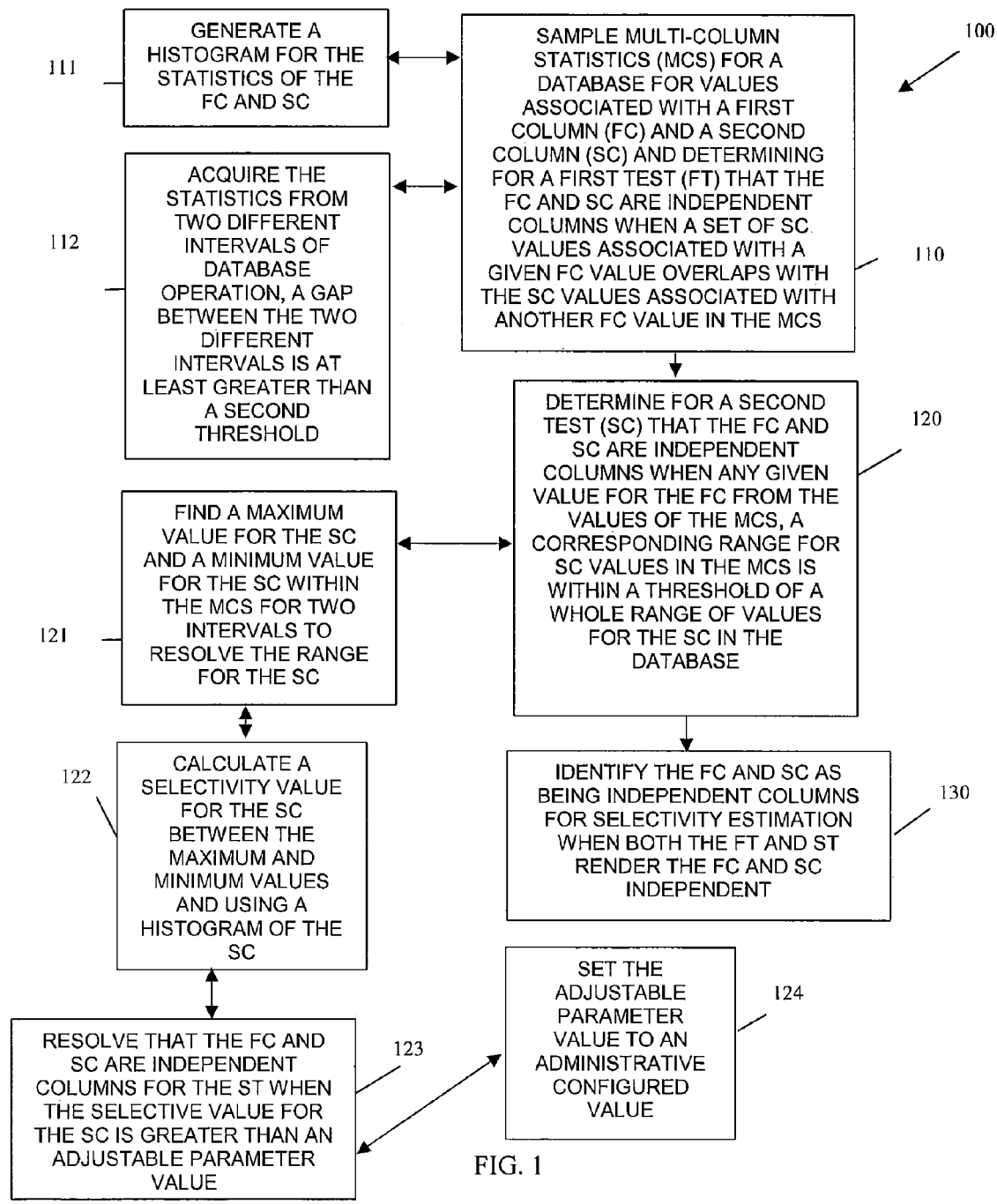
FIG. 1 is a diagram of a method for independent column detection in a selectivity estimation, according to an example embodiment.

FIG. 1 is a diagram of a method 100 for independent column detection in a selectivity estimation, according to an example embodiment. The method 100 (herein after referred to as "independent column resolution service") is implemented in machine-accessible or computer-readable storage medium as instructions that are executed by one or more machines (processors, computers, etc.). Moreover, the independent column resolution service is accessible over a network. The network may be wired, wireless, or a combination of wired and wireless.

A "database" as used herein refers to a relational database. In an embodiment, the database uses a Structured Query Language (SQL) interface.

A narrow definition of an independent column is when every value of one column maps to all values of the other column. Therefore, the number of combined values equals the product of the number of values of individual columns. For example, take Column "nation" and Column "market-segment" of a customer table as an example, each nation participates in the business of all market segments while business in each market segment is provided in all countries. Thus, the value independency detection between two columns can use the relationship between the combined values and the product of individual values.

The broad definition of an independent column is that a value of one column could map to any value or any set of values of the other column. The value mapping between the two columns is random. For example: the Column market-segment and the Column account-balance of a customer table (listed below this paragraph) are an example of such kind of independent columns, whereby a specific account balance is not bound to a specific market segment even though one account balance, say $100.23, doesn't exist in all market segments. Below (in Table 1) is the sampled histogram section of (account-balance, market-segment):

TABLE 1

Interval[12]
    Max. Value: −341.39, 'AUTOMOBI'
    Mode Value: −349.49, 'MACHINER'
Interval[13]
    Max. Value: −281.02, 'FURNITUR'
    Mode Value: −312.03, 'MACHINER'
Interval[14]
    Max. Value: −226.32, 'BUILDING'
    Mode Value: −259.31, 'BUILDING'
.....
Interval[183]
    Max. Value: 9082.16, 'MACHINER'
    Mode Value: 9057.08, 'AUTOMOBI'
Interval[184]
    Max. Value: 9134.95, 'FURNITUR'
    Mode Value: 9089.16, 'AUTOMOBI'

TABLE 1-continued

Interval[185]
    Max. Value: 9189.65, 'FURNITUR'
    Mode Value: 9153.14, 'HOUSEHOL'

For the broad definition case, there is no fixed relationship between the combined values and the product of individual values. Thus advanced algorithms based on randomness are provided to account for this herein and below.

For independent columns of the narrow definition category, theoretically, the equality relationship should be used. However, for application, it's more practical to relax the equality to a small range. Thus two columns are regarded as independent if the number of combined values is close to the multiplication of distinct-value count of the individual column. That is, column c1 and c2 are independent if the number of unique values (#UV) satisfies below formula:

$$\#UV(c1,c2) >= \#UV(c1) * \#UV(c2) * \text{Multi2SnglValueRatio}$$

where Multi2SnglValueRatio is an adjustable parameter with a default value of 0.9.

For independent columns of the broad definition category, double tests are devised to detect value independency to compensate for the information loss in a histogram. In the description of the two algorithms below, database statistics are collected on (c1), (c2) individually and (c1,c2).

It is within this initial context that the processing associated with the real-time database transaction processing service is now discussed in detail.

At 110, the independent column resolution service samples multi-column statistics for a database for values associated with a first column and a second column. Next, a determination for a first test (first algorithm) is made to resolve whether the first and second columns are independent columns when a set of second column values associated with a given first column value overlaps with the second column values associated with another first column value in the multi-column statistics.

According to an embodiment, at 111, the independent column resolution service generates a histogram from the statistics of the first and second columns.

In another embodiment, at 112, the independent column resolution service acquires statistics from two different intervals during database operation. There is also a gap between the two different intervals and the gap is at least greater than a second threshold (the first threshold is discussed herein with reference to the processing at 120).

More specifically, the first test or algorithm associated with the processing of 110-112 is based on an assumption that if the two columns are independent, given any two values of c1 that are far enough apart (second threshold—and configurable value), the value ranges of corresponding column c2 still overlap. This first test can be done by sampling two blocks of equal-height intervals in the multi-column statistics. The first block is from an interval k to k+n, the second block is from an interval j to j+n. During the sampling, the two blocks picked have enough gap, say "j>k+n+p" (second threshold). The two columns are regarded as independent if the ranges of c2 in those two blocks of intervals overlap.

For instance, in the histogram of (account-balance, market-segment) from Table 1, the value range of market-segment in Interval 12 to Interval 14 is from 'AUTOMOBI' to 'MACHINER' while that of Interval 183 to Interval 185 is also 'AUTOMOBI' to 'MACHINER'. So, they overlap and the two columns are said to be independent for this first test.

At 120, the independent column resolution service determines, via a second test (second algorithm), whether the first and second columns are independent columns when any given value for the first column from the multi-column statistics includes a corresponding range for second column values in the multi-column statistics is within a threshold of a whole range of values for the second column in the database.

According to an embodiment, at 121, the independent column resolution service finds a maximum value for the second column and a minimum value for the second column within the multi-column statistics for two intervals to resolve the range for the second column.

Continuing with the embodiment at 121 and at 122, the independent column resolution service calculates a selectivity value for the second column between the maximum and minimum values by utilizing histogram of the second column.

Still continuing with the embodiment at 122 and at 123, the independent column resolution service resolves that the first column and the second column are independent columns for the second test when the selectivity value for the second column is greater than an adjustable parameter value.

Again continuing with the embodiment at 123 and at 124, the independent column resolution service sets the adjustable parameter to a value of 0.6.

So, the second test or second algorithm is based on the assumption that if the two columns are independent, given any value of c1, the range of c2 should be close to (configurable threshold value) the whole range of c2. This test can be done by finding the maximum value and the minimum value of column c2 from Interval k to Interval k+n of the multi-column statistics (c1,c2) and then calculate the selectivity of "c2 BETWEEN min AND max" using c2's histogram. The two columns are considered as independent if the selectivity of "c2 BETWEEN min AND max" is greater than an IndependentValueRatio, which, in an embodiment, is an adjustable parameter with an administrative configured value, such as in one example a default value of 0.6.

For instance, in the histogram of (account-balance, market-segment) of Table 1, the minimum value of market-segment in both interval blocks is 'AUTOMOBI' and the maximum value is 'MACHINER'. The selectivity of "market-segment BETWEEN 'AUTOMOBI' AND 'MACHINER'" is 1.0 from the histogram on column market-segment of Table 1.

At 130, the independent column resolution service identifies the first and second columns as being independent columns for selectivity estimation when both the first and second tests (first and second algorithms) render the first and second columns independent.

That is, to be conservative, the two columns are said to be independent when both the first test and the second test (algorithms 1 and 2 presented above) determine that the two columns are independent. This approach can be used on two column sets, not just two single columns.

Figure 2:
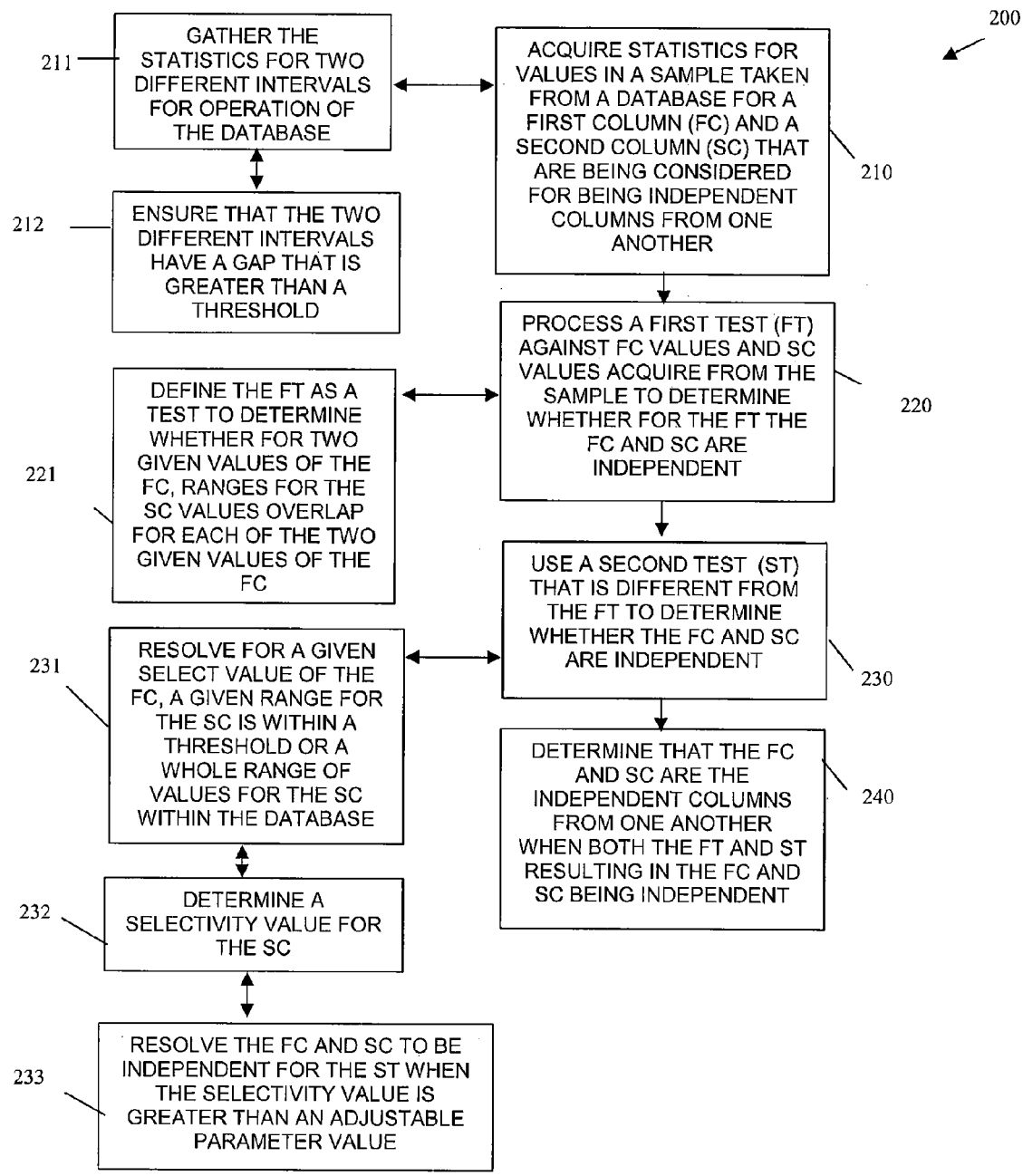
FIG. 2 is a diagram of another method for independent column detection in a selectivity estimation, according to an example embodiment.

FIG. 2 is a diagram of another method 200 for independent column detection in a selectivity estimation, according to an example embodiment. The method 200 (hereinafter referred to as "selectivity estimation service") is implemented in a machine-accessible and computer-readable storage medium as instructions that when executed by a machine (processor, computer, etc.) performs the processing depicted in FIG. 2. Moreover, selectivity estimation service is operational over a network, which may be wired, wireless, or a combination of wired and wireless.

The selectivity estimation service provides another and in some cases enhanced perspective to the independent column resolution service represented by the method 100 of the FIG. 1, discussed in detail above.

At 210, the selectivity estimation service acquires statistics for values in a sample taken from a database for a first column and a second column that are being considered as being independent columns from one another.

According to an embodiment, at 211, the selectivity estimation service gathers the statistics for two different intervals for operation of the database.

Continuing with the embodiment at 211 and at 212, the selectivity estimation service ensures that the two different intervals have a gap that is greater than a threshold. The threshold is configurable and a specific example of the gap determination was presented above with reference to the method 100 of the FIG. 1.

At 220, the selectivity estimation service processes a first test (first algorithm) against first column values and second column values acquired from the sample to determine whether for the first test, the first and second columns are independent. Within the sample, first column values also include corresponding second column values with them, as discussed above with reference to the examples presented in the method 100 of the FIG. 1.

According to an embodiment, at 221, the selectivity estimation service defines the first test as a test to determine whether for two given values of the first column include ranges for the second column values that overlap each of the two given values of the first column. Specific details about this first test were presented in detail along with an example with reference to the method 100 of the FIG. 1.

At 230, the selectivity estimation service uses a second test that is different from the first test to determine whether the first column and the second column are independent.

In an embodiment, at 231, the selectivity estimation service resolves for a given select value of the first column that a given range for the second column is within a threshold or a whole range of values for the second column within the database.

Continuing with the embodiment at 231 and at 232, the selectivity estimation service determines a selectivity value for the second column.

Still continuing with the embodiment at 232 and at 233, the selectivity estimation service resolves the first column and the second column to be independent for the second test when the selectivity value is greater than an adjustable and configurable parameter value.

A specific example with reference to the Table 1 for the second test and the processing depicted at 230-233 was presented in detail above with reference to the method 100 of the FIG. 1.

At 240, the selectivity estimation service determines that the first and second tests are independent columns from one another when both the first test and the second test result in the first and second columns being independent.

Figure 3:
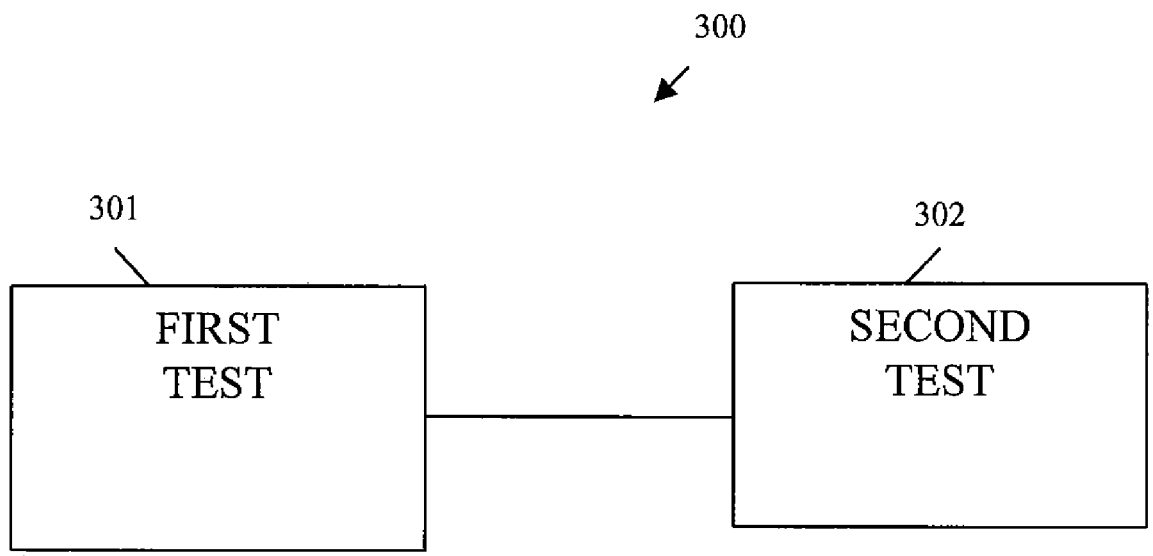
FIG. 3 is a diagram of an independent column detection for selectivity estimation system, according to an example embodiment.

FIG. 3 is a diagram of an independent column detection for selectivity estimation system 300, according to an example embodiment. The independent column detection for selectivity estimation system 300 is implemented in a machine-accessible and computer-readable storage medium as instructions that When executed by a machine(s) (processor(s), computer(s), etc.) performs a variety of processing, such as the processing discussed in detail above with reference to the methods 100 and 200 of the FIGS. 1 and 2.

The independent column detection for selectivity estimation system 300 includes a first test 301 and a second test 302. Each of these and their interactions with one another will now be discussed in detail.

The first test 301 is implemented as instructions in a computer-readable storage medium and executes on a processor of a network. Example aspects and details about the first test 301 along with an example scenario were presented above in detail with reference to the methods 100 and 200 of the FIGS. 1 and 2, respectively.

The second test 302 is implemented as instructions in a computer-readable storage medium that executes on the processor or a different processor of the network. Example aspects and details about the first test 302 along with an example scenario were presented above in detail with reference to the methods 100 and 200 of the FIGS. 1 and 2, respectively.

The first 301 and second tests 302 are different from one another and each is processed to determine whether a first column and a second column within a database are to be considered independent columns. When both the first 301 and second tests 302 determine the first and second columns are independent a determination is made that the first and second columns are in fact independent columns.

According to an embodiment, the first test 301 determines the first and second columns are independent when for two sampled values for the first column, corresponding ranges for second column values of the second column overlap. This was described in detail above with reference to the methods 100 and 200 of the FIGS. 1 and 2, respectively.

In another situation, the second test 302 determines the first and second columns are independent when a sampled value for the first column and a corresponding range associated with the sampled value for the second column is within a threshold of a whole range for the second column within the database.

In an embodiment, the first 301 and second tests 302 use sampled values from statistics (multi-column statistics and individual single-column statistics) acquired from the database.

In another embodiment, the first 301 and second tests 302 use two different intervals within the sampled values and the two different intervals are separated by a gap that exceeds a threshold value.

For another situation, when the first and second columns are determined to be the independent columns by both the first 301 and second tests 302, a first selectivity value for the first column is acquired and multiplied against a second selectivity value for the second column to get a combined multi-column selectivity value for both the first and second columns.

It is now appreciate how the techniques presented herein and above improve the confidence and accuracy of single table cardinality estimations by detecting the independent columns and applying the approaches discussed herein for combining selectivity of independent columns for multi-column selectivity analysis.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and processed by a processor to perform the method, comprising:
    sampling multi-column statistics for a database for values associated with a first column and a second column and determining for a first test that the first and second columns are independent columns when a set of second column values associated with a given first column value overlaps with the second column values associated with another first column value in the multi-column statistics;
    determining for a second test that the first and second columns are independent columns when any given value for the first column from the values of the multi-column statistics includes a corresponding range for second column values in the multi-column statistics is within a threshold of a whole range of values for the second column in the database; and
    identifying the first and second columns as being independent columns for selectivity estimation when both the first and second tests render the first and second columns independent.

2. The method of claim 1, wherein sampling further includes generating a histogram for the statistics of the first and second columns.

3. The method of claim 1, wherein sampling further includes acquiring the statistics from two different intervals of database operation, wherein a gap between the two different intervals is at least greater than a second threshold.

4. The method of claim 1, wherein determining further includes finding a maximum value for the second column and a minimum value for the second column within the multi-column statistics for two intervals to resolve the range for the second column.

5. The method of claim 4, wherein finding further includes calculating a selectivity value for the second column between the maximum and minimum values and using a histogram of the second column.

6. The method of claim 5, wherein calculating further includes resolving that the first and second columns are independent columns for the second test when the selective value for the second column is greater than an adjustable parameter value.

7. The method of claim 6, wherein resolving further includes setting the adjustable parameter value to an administrative configured value.

8. A method implemented in a computer-readable storage medium and processed by a processor to perform the method, comprising:
    acquiring statistics for values in a sample taken from a database for a first column and a second column that are being considered for being independent columns from one another;
    processing a first test against first column values and second column values from the sample to determine whether the first and second columns are independent;
    using a second test that is different from the first test to determine whether the first and second columns are independent; and
    determining that the first and second columns are independent from one another when both the first and second tests result in the first and second columns being independent.

9. The method of claim 8, wherein acquiring further includes gathering the statistics for two different intervals for operation of the database.

10. The method of claim 9 further comprising, ensuring that the two different intervals have a gap that is greater than a threshold.

11. The method of claim 8, wherein processing further includes defining the first test as a test to determine whether for two given values of the first column, ranges for the second column values overlap for each of the two given values of the first column.

12. The method of claim 8, wherein using further includes resolving for a given select value of the first column, that a given range for the second column is within a threshold or a whole range of values for the second column within the database.

13. The method of claim 12 further comprising, determining a selectivity value for the second column.

14. The method of claim 13 further comprising, resolving the first and second columns to be independent for the second test when the selectivity value is greater than an adjustable parameter value.

15. A computer-implemented system that executes on one or more processors, the system comprising:
    a first test implemented as instructions in a computer-readable storage medium and to execute on a processor of a network; and
    a second test implemented as instructions in a computer-readable storage medium and to execute on the processor or a different processor of the network;
    wherein the first and second tests are different from one another and each are processed to determine whether a first column and a second column within a database are to be considered independent columns, and wherein when both the first and second tests determine the first and second columns are independent a determination is made that the first and second columns are the independent columns.

16. The system of claim 15, wherein the first test determines the first and second columns are independent when for two sampled values for the first column, corresponding ranges for second column values of the second column overlap.

17. The system of claim 15, wherein the second test determines the first and second columns are independent when a sampled value for the first column and a corresponding range associated with the sampled value for the second column is within a threshold of a whole range for the second column within the database.

18. The system of claim 15, wherein the first and second tests use sampled values from statistics acquired from the database.

19. The system of claim 18, wherein the first and second tests use two different intervals within the sampled values and the two different intervals are separated by a gap that exceeds a threshold.

20. The system of claim 15, wherein when the first and second columns are determined to be the independent columns, a first selectivity value for the first column is multiplied against a second selectivity value for the second column to get a combined selectivity for both the first and second columns.

* * * * *